United States Patent
Wigard et al.

(10) Patent No.: US 8,989,082 B2
(45) Date of Patent: Mar. 24, 2015

(54) APPARATUS, METHODS, COMPUTER PROGRAM PRODUCTS AND SYSTEMS PROVIDING RACH PARAMETERS IN A BROADCAST CHANNEL FOR A RANDOM ACCESS PROCEDURE

(75) Inventors: Jeroen Wigard, Klarup (DK); Harri Holma, Helsinki (FI); Karri Ranta-Aho, Espoo (FI); Juho Pirskanen, Tampere (FI); Benoist Sebire, Tokyo (JP)

(73) Assignee: Nokia Corporation, Espoo (FI)

( * ) Notice: Subject to any disclaimer, the term of this patent is extended or adjusted under 35 U.S.C. 154(b) by 894 days.

(21) Appl. No.: 12/513,166

(22) PCT Filed: Oct. 29, 2007

(86) PCT No.: PCT/IB2007/003281
§ 371 (c)(1),
(2), (4) Date: Jun. 18, 2010

(87) PCT Pub. No.: WO2008/053321
PCT Pub. Date: May 8, 2008

(65) Prior Publication Data
US 2010/0329182 A1    Dec. 30, 2010

Related U.S. Application Data

(60) Provisional application No. 60/855,309, filed on Oct. 30, 2006.

(51) Int. Cl.
*H04B 7/204* (2006.01)
*H04W 48/10* (2009.01)
(Continued)

(52) U.S. Cl.
CPC ............ *H04W 48/10* (2013.01); *H04W 74/008* (2013.01); *H04W 74/0833* (2013.01); *H04W 74/0866* (2013.01)
USPC ........... 370/319; 370/329; 370/344; 370/348; 370/350

(58) Field of Classification Search
USPC ................. 370/319–322, 324, 329, 335–337, 370/342–350
See application file for complete search history.

(56) References Cited

U.S. PATENT DOCUMENTS

| 5,796,738 A | 8/1998 | Scott et al. |
| 5,960,445 A | 9/1999 | Tamori et al. |

(Continued)

FOREIGN PATENT DOCUMENTS

| EP | 1400049 A1 | 3/2004 |
| EP | 1643690 A1 | 4/2006 |

(Continued)

OTHER PUBLICATIONS

Office Action received in corresponding Korean Application No. 10-2009-7010973, Dated Sep. 29, 2011, 5 pages.

(Continued)

*Primary Examiner* — Alvin Zhu
(74) *Attorney, Agent, or Firm* — Harrington & Smith (57) ABSTRACT

In one non-limiting, exemplary embodiment, a method includes: receiving at least one parameter from a broadcast channel (51); determining, using the received at least one parameter, information including at least one of an initial bit rate to use when transmitting on a random access channel (RACH) and an automatic repeat request (ARQ) profile to use when transmitting on the RACH (52); and transmitting a message on the RACH in accordance with the determined information (53).

20 Claims, 3 Drawing Sheets

(51) Int. Cl.
*H04W 74/00* (2009.01)
*H04W 74/08* (2009.01)

(56) References Cited

U.S. PATENT DOCUMENTS

| | | | |
|---|---|---|---|
| 5,966,636 A | 10/1999 | Corrigan et al. | |
| 6,098,126 A | 8/2000 | Batson et al. | |
| 6,272,117 B1 | 8/2001 | Choi et al. | |
| 6,282,644 B1 | 8/2001 | Ko | |
| 6,574,267 B1* | 6/2003 | Kanterakis et al. | 375/141 |
| 6,611,514 B1 | 8/2003 | Moulsley | 370/348 |
| 6,643,318 B1 | 11/2003 | Parsa et al. | |
| 6,738,366 B1 | 5/2004 | Etemad et al. | |
| 7,013,146 B2* | 3/2006 | Wang et al. | 455/455 |
| 7,136,994 B2 | 11/2006 | Zimmer et al. | |
| 7,293,165 B1 | 11/2007 | Tobias | |
| 2003/0223452 A1 | 12/2003 | Toskala et al. | |
| 2004/0110521 A1* | 6/2004 | Soldani et al. | 455/509 |
| 2004/0136403 A1 | 7/2004 | Kekki | 370/477 |
| 2004/0264497 A1 | 12/2004 | Wang et al. | 370/465 |
| 2005/0047344 A1 | 3/2005 | Seol | |
| 2005/0122933 A1 | 6/2005 | Kwon et al. | |
| 2005/0157678 A1 | 7/2005 | Mantha et al. | |
| 2005/0243763 A1 | 11/2005 | Toskala et al. | 370/328 |
| 2005/0271025 A1 | 12/2005 | Guethaus et al. | 370/342 |
| 2006/0146762 A1 | 7/2006 | Kuroda et al. | |
| 2006/0167919 A1 | 7/2006 | Hsieh | |
| 2006/0168189 A1 | 7/2006 | Huang | |
| 2006/0183429 A1 | 8/2006 | Anderson | |
| 2006/0209692 A1 | 9/2006 | Usuda et al. | |
| 2006/0268717 A1 | 11/2006 | Kanterakis | 370/235 |
| 2006/0281417 A1* | 12/2006 | Umesh et al. | 455/69 |
| 2007/0064665 A1 | 3/2007 | Zhang et al. | |
| 2007/0094426 A1 | 4/2007 | Chiang et al. | |
| 2007/0104177 A1 | 5/2007 | Hwang et al. | |
| 2007/0147326 A1 | 6/2007 | Chen | |
| 2007/0186086 A1 | 8/2007 | Lambert et al. | |
| 2007/0189237 A1 | 8/2007 | Jaatinen et al. | 370/335 |
| 2007/0189365 A1 | 8/2007 | Olsson et al. | |
| 2009/0268676 A1 | 10/2009 | Wigard et al. | |
| 2010/0182974 A1 | 7/2010 | Barraclough et al. | |
| 2012/0140715 A1* | 6/2012 | Cave et al. | 370/329 |

FOREIGN PATENT DOCUMENTS

| | | | |
|---|---|---|---|
| EP | 1743503 A1 | 1/2007 | |
| WO | 0021320 A1 | 4/2000 | |
| WO | 03/003643 A1 | 1/2003 | |
| WO | 03100988 A2 | 12/2003 | |
| WO | WO-2005/109941 A1 | 11/2005 | |
| WO | 2008/053321 A2 | 5/2008 | |
| WO | 2008/156315 A2 | 12/2008 | |
| WO | 2009/020423 A1 | 2/2009 | |

OTHER PUBLICATIONS

NSN, Nokia "Further Discussion on Enhanced Cell_FACH in REL8", 3GPP TSG-RAN WG2 #59, R2073254, Aug. 20-24, 2007, Athens, Greece.
Nokia Corporation, Nokia Siemens Networks, "Collision Detection Mechanism in Enhanced Random Access with E-DCH", 3GPP TSG-RAN WG2 #59bis, R2-074013, Oct. 18-12, 2007, Shanghai, China.
"Golden Bridge Technology", Intellectual Property, Retrieved on Apr. 18, 2012, Webpage available at : http://www.gbtwireless.com/IntellectualProp.htm.
International Preliminary Report on Patentability received for corresponding Patent Cooperation Treaty Application No. PCT/IB2007/002852, dated Mar. 31, 2009, 6 pages.
International Search Report and Written Opinion received for corresponding Patent Cooperation Treaty Application No. PCT/IB2007/002852, dated Sep. 12, 2008, 8 pages.
International Preliminary Report on Patentability received for corresponding Patent Cooperation Treaty Application No. PCT/IB2007/003281, dated May 5, 2009, 8 pages.

"Universal Mobile Telecommunications System (UMTS), FDD enhanced uplink, Overall description, Stage 2", 3GPP TS 25.309, v6.6.0, Release 6, ETSI TS 125 309, v6.6.0, Mar. 2006, pp. 1-35.
Ghosh et al., "Overview of enhanced uplink for 3GPP W-CDMA", IEEE 59th Vehicular Technology Conference, vol. 4, May 17-19, 2004, pp. 2261-2265.
International Search Report and Written Opinion received for corresponding Patent Cooperation Treaty Application No. PCT/IB2007/003281, dated Jul. 10, 2008, 10 pages.
"Layer 1 Procedure of Non-synchronized Random Access in E-UTRA", 3GPP TSG RAN WGI Meeting #46bis, RI-062501, Oct. 9-13, 2006, pp. 1-5.
Office action received for corresponding European Patent Application No. 07858852.2, dated Mar. 10, 2010, 6 pages of Office Action.
"3rd Generation Partnership Project, Technical Specification Group Radio Access Network, Medium Access Control (MAC) protocol specification, Release 6", 3GPP TS 25.321, v6.10.0, Sep. 2006, pp. 1-89.
"3rd Generation Partnership Project, Technical Specification Group Radio Access Network, FDD Enhanced Uplink, Overall description, Stage 2, Release 6", 3GPP TS 25.309, v6.6.0, Mar. 2006, pp. 1-34.
Reig et al., "Random access channel (RACH) parameters optimization in WCDMA systems", IEEE 60th Vehicular Technology Conference, vol. 6, Sep. 26-29, 2004, pp. 4296-4300.
"Further Discussion on Delay Enhancements in Rel7", 3GPP TSG-RAN WG2 Meeting #53, R2-061189, Nokia, May 8-12, 2006, 5 pages.
"3rd Generation Partnership Project, Technical Specification Group Radio Access Network, Physical layer—Measurements (FDD), Release 4", 3GPP TS 25.215, v4.8.0, Mar. 2005, pp. 1-17.
"3rd Generation Partnership Project, Technical Specification Group Radio Access Network, Physical layer procedures (FDD), Release 4", 3GPP TS 25.214, v4.6.0, Mar. 2003, pp. 1-51.
"3rd Generation Partnership Project, Technical Specification Group Radio Access Network, Spreading and modulation (FDD), Release 4", 3G TS 25.213, v4.4.0, Dec. 2003, pp. 1-26.
"3rd Generation Partnership Project, Technical Specification Group Radio Access Network, Physical channels and mapping of transport channels onto physical channels (FDD), Release 4", 3GPP TS 25.211, v4.6.0, Sep. 2002, pp. 1-46.
"3rd Generation Partnership Project, Technical Specification Group Radio Access Network, Multiplexing and channel coding (FDD), Release 4", 3GPP TS 25.212, v4.6.0, Sep. 2002, pp. 1-62.
"3rd Generation Partnership Project, Technical Specification Group Radio Access Network, High Speed Downlink Packet Access (HSDPA), Overall description, Stage 2", Release 7, 3GPP TS 25.308, v7.3.0, Jun. 2007, pp. 1-45.
"3rd Generation Partnership Project, Technical Specification Group Radio Access Network, Physical Layer Procedures (FDD), Release 7", 3GPP TS 25.214, v7.5.0, May 2007, pp. 1-84.
"Adaptive channel switching for admission control with QoS and priority in WCDMA uplink", IEEE International Conference on Performance, Computing, and Communications, 2004, pp. 69-76.
Final Office action received for corresponding U.S. Appl. No. 12/226,540, dated Apr. 28, 2011, 17 pages.
Non-Final Office action received for corresponding U.S. Appl. No. 12/226,540, dated Dec. 8, 2010, 10 pages.
Office action received for corresponding Chinese Patent Application No. 200780045527.4, dated Apr. 20, 2011, 4 pages of Office Action and 6 pages of Office Action translation.
Office action received for corresponding Korean Patent Application No. 2009-7010973, dated Sep. 29, 2011, 3 pages of Office Action and 2 pages of Office Action translation.
Office action received for corresponding Korean Patent Application No. 2009-7010973, dated Mar. 28, 2012, 3 pages of Office Action and 2 pages of Office Action translation.
Office action received for corresponding Chinese Patent Application No. 200780045527.4, dated Mar. 21, 2012, 4 pages of Office Action and 7 pages of Office Action translation.
Office action received for corresponding European Patent Application No. 07858852.2, dated Jun. 6, 2011, 7 pages of Office Action.

(56) References Cited

OTHER PUBLICATIONS

Office action received for corresponding Chinese Patent Application No. 200780042412.X, dated Jul. 13, 2011, 5 pages of Office Action and 9 pages of Office Action translation.
Office action received for corresponding Chinese Patent Application No. 200780042412.X, dated Feb. 6, 2012, 3 pages of Office Action and 4 pages of Office Action translation.
Office action received for corresponding Veitnamese Patent Application No. 1-2009-1112, dated Nov. 11, 2009, 1 page of Office Action and 1 page of Office Action translation.

3GPP TS 25.211 V4.0.0 (Mar. 2001); "3rd Generation Partnership Project; Technical Specification Group Radio Access Network; Physical channels and mapping of transport channels onto physical channels (FDD) (Release 4)"; Mar. 2001; whole document (45 pages).
Nokia et al.; "On collision resolution with Enhanced UL CELL_FACH state"; 3GPP TSG-RAN WG2 Meeting #60; R2-074622; Nov. 5-9, 2007; Jeju, Korea; whole document (3 pages).
Etemad, K.; "Enhanced Random Access and Reservation Scheme in CDMA2000"; IEEE Personal Communications; Apr. 2001; whole document (7 pages).

\* cited by examiner

APPARATUS, METHODS, COMPUTER PROGRAM PRODUCTS AND SYSTEMS PROVIDING RACH PARAMETERS IN A BROADCAST CHANNEL FOR A RANDOM ACCESS PROCEDURE

RELATED APPLICATION

This application was originally filed as PCT Application No. PCT/IB2007/003281 filed 29 Oct. 2007 which claims priority to U.S. Application 60/855,309 which was filed on 30 Oct. 2006.

TECHNICAL FIELD

The exemplary and non-limiting embodiments of this invention relate generally to wireless communication systems, methods, devices and computer program products and, more specifically, relate to techniques for sending information from a user equipment to a wireless network element over a random access channel

BACKGROUND

The following abbreviations are herewith defined:
3GPP third generation partnership project
ACK acknowledgement
AICH acquisition indicator channel
ARQ automatic repeat request
BCH broadcast channel
CPCH common packet channel
E-AGCH E-DCH absolute grant channel (in downlink)
E-DCH enhanced dedicated channel
E-DPCCH enhanced dedicated physical control channel (uplink L1 information concerning data rate)
E-DPDCH enhanced dedicated physical channel (uplink data channels)
E-HICH E-DCH hybrid ARQ indicator channel (in downlink)
E-RGCH E-DCH relative grant channel
E-TFC E-DCH transport format combination
FACH forward access channel
F-DPCH fractional dedicated physical channel
HARQ hybrid automatic repeat request
HS high speed
HSUPA high speed uplink packet access
L1 Layer 1 (physical)
MAC medium access control
NACK negative acknowledgement
Node B base station
PC power control
RACH random access channel
RNC radio network controller
RRC radio resource control
SIB system information block
TCP transport control protocol
UE user equipment, such as a mobile station or mobile terminal
WCDMA wideband code division multiple access The data rates for RACH (Release 99) are very low. More specifically, the practical instantaneous data rate is 16 kbps (16 thousand bits per second, or 320 bits in 20 ms) and effectively <10 kbps when preamble power ramping is taken into account. The RACH thus cannot be used in any practical manner for the transmission of large packet calls, and no enhancements to RACH were proposed in later releases (post Release 99). Further, in the event of a failed RACH transmission the retransmission delays are significant, on the order of seconds.

In addition, in Release 99 the dedicated channel setup times from CELL_FACH to CELL_DCH are substantial, which is partially due to the signaling needed before the dedicated connection can be established using the slow RACH. This leads to considerably longer delays than are necessary for small to medium sized amounts of data to be transferred. A large part of the total time is spent before any bits can actually be delivered in the CELL_DCH state. Using the HSUPA physical channel that is currently only available in the CELL_DCH state increases the data rates considerably in comparison to what the RACH can provide. In such a manner, it is possible to start data transmission in the CELL_FACH state using the HSUPA channels with practically no break in the transition to the CELL_DCH state, where the transmission can continue using the same channel.

The bit rate of the RACH is set, and can be changed by RRC signaling. However, this can be a burdensome process. Furthermore, the RRC signaling itself may cause a state change in the CELL_DCH.

A HS-FACH concept has been proposed in 3GPP as R2-061189, "Further discussion on delay enhancements in Re17", Nokia, 8-12 May 2006. The proposed HS-FACH can provide downlink CELL_FACH state data rates of hundreds of kbps to greater than 1 Mbps (million bits per second). However, in order to obtain the full benefit of the improved downlink, corresponding CELL_FACH state capability improvements would be needed in the uplink CELL_FACH state capabilities. Especially for TCP-based applications, the end user experience will depend as well on the uplink data rates if the downlink data rates are significantly increased, since TCP acknowledgements are sent in the reverse link.

A CPCH was included in 3GPP Release 99 specifications and in some subsequent releases as well. The CPCH was intended to be an extension of RACH. Reference in this regard can be made to:

3GPP TS25.211, V4.6.0 (2002-September), 3rd Generation Partnership Project; Technical Specification Group Radio Access Network; Physical channels and mapping of transport channels onto physical channels (FDD) (Release 4);

3GPP TS25.212, V4.6.0 (2002-September), 3rd Generation Partnership Project; Technical Specification Group Radio Access Network; Multiplexing and channel coding (FDD) (Release 4);

3GPP TS25.213, V4.4.0 (2003-December), 3rd Generation Partnership Project; Technical Specification Group Radio Access Network; Spreading and modulation (FDD) (Release 4);

3GPP TS25.214, V4.6.0 (2003-March), 3rd Generation Partnership Project; Technical Specification Group Radio Access Network; Physical layer procedures (FDD) (Release 4); and 3GPP TS25.215, V4.8.0 (2005-March), 3rd Generation Partnership Project; Technical Specification Group Radio Access Network; Physical layer-Measurements (FDD) (Release 4).

The CPCH was defined in Section 4.1.2.5 of 3GPP TS25.211 V4.6.0 as being an uplink transport channel that is associated with a dedicated channel on the downlink which provides power control and CPCH control commands for the uplink CPCH. The CPCH is characterized by having an initial collision risk, and by being transmitted using inner loop power control commands.

However, the CPCH was not implemented and it was removed from 3GPP Release 5 specifications. The CPCH thus did not include L1 enhancements, since these enhancements were included for the uplink only with HSUPA in Release 6. The L1 enhancements include fast L1 retransmission, Hybrid ARQ, and fast capacity allocations.

Notably, the allocation of a bit rate on the CPCH was fixed, as on the RACH.

SUMMARY

In an exemplary aspect of the invention, a method includes: receiving at least one parameter from a broadcast channel; determining, using the received at least one parameter, information comprising at least one of an initial bit rate to use when transmitting on a random access channel (RACH) and an automatic repeat request (ARQ) profile to use when transmitting on the RACH; and transmitting a message on the RACH in accordance with the determined information. In further exemplary embodiments, the method may be implemented as a computer program, such as a computer program executable by a user equipment or a processor of a user equipment. In other exemplary embodiments, the method may be implemented as a computer program product including program instructions embodied on a tangible computer-readable medium, execution of the program instructions results in steps of the method.

In another exemplary aspect of the invention, an apparatus includes: a receiver configurable to receive at least one parameter from a broadcast channel; a processor configurable to determine, using the received at least one parameter, information comprising at least one of an initial bit rate to use when transmitting on a random access channel (RACH) and an automatic repeat request (ARQ) profile to use when transmitting on the RACH; and a transmitter configurable to transmit a message on the RACH in accordance with the determined information.

In a further exemplary aspect of the invention, an apparatus includes: means for receiving at least one parameter from a broadcast channel; means for determining, using the received at least one parameter, information comprising at least one of an initial bit rate to use when transmitting on a random access channel (RACH) and an automatic repeat request (ARQ) profile to use when transmitting on the RACH; and means for transmitting a message on the RACH in accordance with the determined information.

In another exemplary aspect of the invention, a method includes: determining information comprising at least one of an initial bit rate to be used for transmissions on a random access channel (RACH) and an automatic repeat request (ARQ) profile to be used for transmissions on the RACH; and transmitting at least one parameter over a broadcast channel, wherein the at least one parameter is indicative of the determined information. In further exemplary embodiments, the method may be implemented as a computer program, such as a computer program executable by a user equipment or a processor of a user equipment. In other exemplary embodiments, the method may be implemented as a computer program product including program instructions embodied on a tangible computer-readable medium, execution of the program instructions results in steps of the method.

In a further exemplary aspect of the invention, an apparatus includes: a processor configurable to determine information comprising at least one of an initial bit rate to be used for transmissions on a random access channel (RACH) and an automatic repeat request (ARQ) profile to be used for transmissions on the RACH; and a transmitter configurable to transmit at least one parameter over a broadcast channel, wherein the at least one parameter is indicative of the determined information.

In another exemplary aspect of the invention, an apparatus includes: means for determining information comprising at least one of an initial bit rate to be used for transmissions on a random access channel (RACH) and an automatic repeat request (ARQ) profile to be used for transmissions on the RACH; and means for transmitting at least one parameter over a broadcast channel, wherein the at least one parameter is indicative of the determined information.

In a further exemplary aspect of the invention, a system includes: a first apparatus configurable to determine information comprising at least one of an initial bit rate to be used for transmissions on a random access channel (RACH) and an automatic repeat request (ARQ) profile to be used for transmissions on the RACH, and further configurable to transmit at least one parameter over a broadcast channel, wherein the at least one parameter is indicative of the determined information; and a second apparatus configurable to receive the at least one parameter from the broadcast channel, to determine, using the received at least one parameter, the information, and further to transmit a message on the RACH in accordance with the determined information.

In another exemplary aspect of the invention, a wireless communication system includes: a first apparatus comprising a first processor and a first transmitter, wherein the first processor is configurable to determine information comprising at least one of an initial bit rate to be used for transmissions on a random access channel (RACH) and an automatic repeat request (ARQ) profile to be used for transmissions on the RACH, wherein the first transmitter is configurable to transmit at least one parameter over a broadcast channel, wherein the at least one parameter is indicative of the determined information; and a second apparatus comprising a receiver, a second processor and a second transmitter, wherein the receiver is configurable to receive the at least one parameter from the broadcast channel, wherein the second processor is configurable to determine, using the received at least one parameter, the information, wherein the second transmitter is configurable to transmit a message on the RACH in accordance with the determined information.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 1:
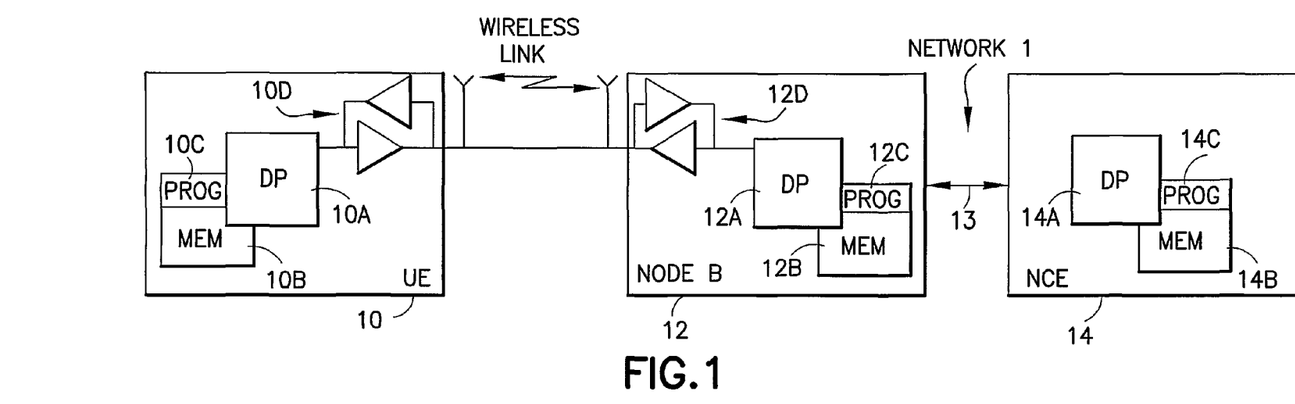
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1, a wireless network 1 is adapted for communication with a UE 10 via a Node B (base station) 12. The network 1 may include a network control element (NCE) 14. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the NCE 14 that also includes a DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail. As a non-limiting example, the NCE 14 may comprise a RNC.

That is, the exemplary embodiments of this invention may be implemented at least in part by computer software executable by the DP 10A of the UE 10 and by the DP 12A of the Node B 12, or by hardware, or by a combination of software and hardware.

In general, the various embodiments of the UE 10 can include, but are not limited to, mobile phones, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

In U.S. Provisional Patent Application No. 60/848,106, filed Sep. 29, 2006, "Apparatus, Method and Computer Program Product Providing Usage Of E-DCH as RACH Shared Channel", Jeroen Wigard, Karri Ranta-aho and Harri Holma disclose a high speed RACH technique, in particular one that provides improvements in uplink RACH capabilities to take full advantage of the improved downlink FACH capability. The above-referenced U.S. Provisional Patent Application No. 60/848,106 is incorporated by reference herein in its entirety.

The exemplary embodiments of the invention disclosed in the above-referenced U.S. Provisional Patent Application No. 60/848,106 provide a high speed RACH (HS-RACH) and use existing (already specified) physical channels as shared channels.

More specifically, one or several uplink E-DPDCH and/or E-DPCCH are used as shared channels, and one or several sets of downlink L1 feedback channels are used as shared channels. The downlink L1 feedback channels carry power control (F-DPCH), re-transmission requests (ACK/NACK, E-HICH) and capacity allocations (E-AGCH, E-RGCH), while the uplink shared channels are used to transmit a message (which may include data) from the UE 10 to the Node B 12.

The exemplary embodiments of this invention provide a technique to allocate the initial bit rate on the HS-RACH in a rapid manner, and that avoids the need for user-specific signaling that would require setup of user-specific signaling channels.

The exemplary embodiments of this invention relate at least in part to 3GPP WCDMA Radio Access, and to the use of Release 6 HSUPA physical channels as shared channels, and describe a technique to allocate the initial bit rate for the shared transport channel (as transmitted using these physical channels) by the use of a broadcast channel. The exemplary embodiments of this invention further describe a technique to deliver a HARQ or ARQ profile for the shared transport channel by the use of a broadcast channel.

While the exemplary embodiments may be described herein in the context of a WCDMA system, it should be appreciated that the exemplary embodiments of this invention are not limited for use with only this one particular type of wireless communication system, and that they may be used to advantage in other types of wireless communication systems. Furthermore, the specific channels and communication (e.g., messages) described should be viewed as non-limiting examples. The exemplary embodiments of the invention may be utilized for different channels and communication.

Note that the transport channels are generally carried over the air using physical channels. For example, E-DCH is a HSUPA transport channel. That is, the E-DPCCH and E-DPDCH are used in the downlink to deliver the E-DCH packet from a Node B to a UE. The exemplary embodiments of this invention reuse the E-DPCCH/E-DPDCH. DPDCH. In other embodiments of the invention, the transport channel may be the E-DCH. In further embodiments of the invention, the transport channel may not be the E-DCH.

In accordance with exemplary embodiments of a method, apparatus and computer program product(s) disclosed in the above-referenced U.S. Provisional Patent Application No. 60/848,106, the UE 10 sends a preamble and the Node B 12 sends an acquisition indication and a HS-RACH channel assignment to the UE 10. At this point, the UE 10 is assigned a unique spreading code for use with its uplink transmissions so that the Node B 12 can identify those HS-RACH transmissions sent by the UE 10. A power control preamble procedure is then initiated (e.g., for about 10 ms to about 30 ms) in cooperation with downlink F-DPCH channel to adjust the power level of the uplink E-DPDCH to be used by the UE 10 for random access purposes, that is, like a RACH. One or several E-DPDCHs are reserved for the HS-RACH common usage and data transmission begins over the E-DPDCH at a first bit rate, while the DPCCH and E-DPCCH are used for power reference and for control information. L1 feedback (e.g., ACK/NACK feedback) is carried on the downlink common channels for a message being sent using the E-DPDCH. In response to the UE 10 receiving a capacity allocation on the E-AGCH, the data can continue to be sent over the HS-RACH using the E-DPDCH but at a second bit rate, while the DPCCH and E-DPCCH continue to be used for power reference and control information. Note that these various channels (e.g., the E-DPDCH) are actually defined in the standards for use only in the dedicated mode when the UE is in the CELL_DCH state, and not as shared channels when the UE is in any other state such as the CELL_FACH state.

Figure 2:
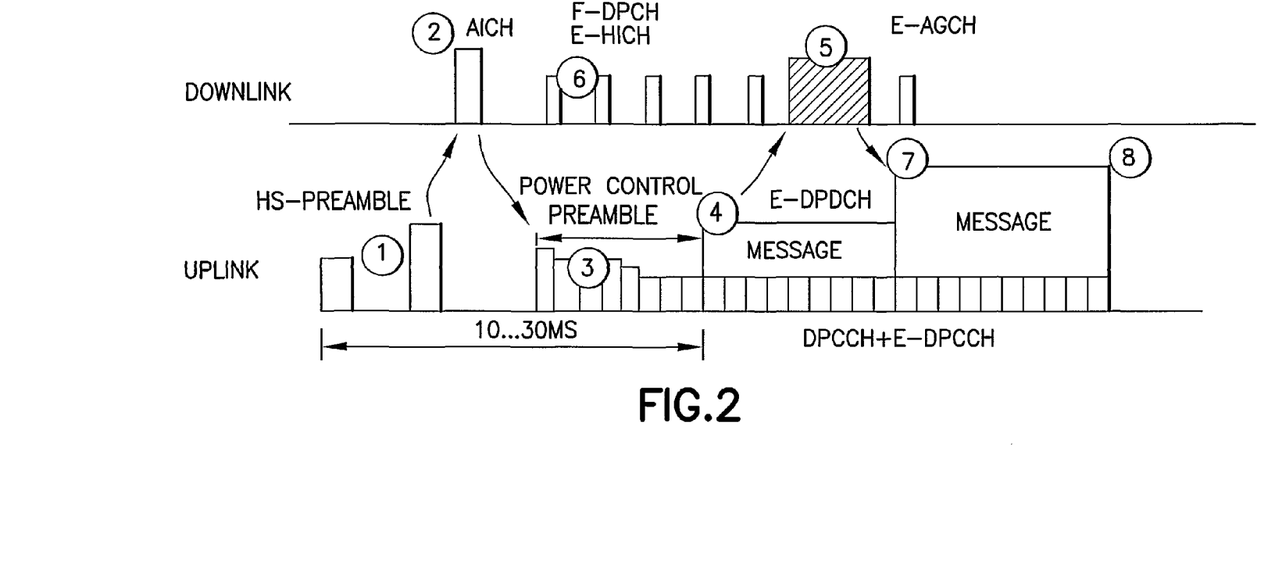
FIG. 2 shows a non-limiting arrangement of uplink channels and downlink channels for implementing the HS-RACH in accordance with some exemplary embodiments of the invention.

FIG. 2 shows a non-limiting arrangement of uplink channels (UE to Node B) and downlink channels (Node B to UE) for implementing the HS-RACH in accordance with some exemplary embodiments of the invention. Referring to FIG. 2, and in accordance with the exemplary embodiments of this invention, at (1) a specific preamble to indicate usage of the HS-RACH is sent by the UE 10 using a specific access slot. At (2) a channel assignment for the HS-RACH is sent to the UE 10 using the AICH. The AICH may, for example, be as defined in Release 99, and two bits may be employed to make the channel assignment (e.g., with 4× repetition). At (3) a power control preamble allows the Node B 12 to obtain synchronization, possibly in a manner similar to that used in DCH synchronization. The initial transmit power of the data transmission used by the UE 10 may, for example, be based on the last previously used preamble power, with suitable offset(s) being applied. The preamble power may be set using an open loop power control method as defined in Release 99.

At (4), and in accordance with some exemplary embodiments of this invention, data transmission begins with an initial bit rate given to the UE 10 in the BCH. The UE 10 sends a measurement report to the RNC (e.g., to the NCE 14) if a traffic volume threshold is exceeded. The RNC begins allocation of a dedicated connection. (Note that the measurement report may be sent using the HS-RACH.)

In one non-limiting, exemplary embodiment, the initial bit rate employed by the UE 10 in the HS-RACH transmission is broadcast on the cell level by the BCH. More specifically, what is broadcast may be a Serving Grant (SG) parameter for the E-TFC selection block of the UE 10 to be used for the E-TFC selection for transmitting a random access type of a message on the shared E-DCH resource. The allocated bit rate (SG) may be dependent on the load in the cell, such that in case of low load the allocated bit rate is high and in case of high load the allocated bit rate is low. In this manner, the risk of failure (to acquire the HS-RACH) is minimized while maximizing the bit rate on the HS-RACH. In a case of more than one HS-RACH the bit rate may be set accordingly.

Note further that the data transmission procedure initiated at (4) may use a HARQ profile that is predefined for the HSUPA, or it may be one delivered to the UE 10 in a BCH. The HARQ profile may be as defined for HSUPA, or alternatively the Node B 12 or the RNC (e.g., NCE 14) may create a RACH-HARQ profile which is then broadcast into the cell on a BCH. 3GPP TS 25.309 V6.6.0 defines a HARQ profile as having a power offset attribute and/or a maximum number of retransmissions. If a HARQ profile is not sent then the UE may use a default profile as defined in the standard. Reference may be made to 3GPP TS 25.309, V6.6.0 (2006-March), 3rd Generation Partnership Project; Technical Specification Group Radio Access Network; FDD Enhanced Uplink; Overall Description; Stage 2 (Release 6).

At (5), the E-AGCH may be used for collision detection as well as for assigning new data rates. A PC preamble or MAC-e header may be used to deliver a random identification (ID) that is expected to be returned on the E-AGCH as an indication that this particular UE is being heard and may continue transmission. Reference can be had to 3GPP TS25.309 V6.6.0, Section 7.2.5, for a discussion of the MAC-e.

At (6) the HICH and F-DPCH are used to provide downlink feedback. The F-DPCH timing may be defined based on the RACH access slot/E-DCH (HS-RACH) channel assignment. At (7) the UE 10 may request a higher bit rate, such as through the use of a Happy bit, and in response the Node B 12 may increase the UL data rate. At (8) at least one of the following occurs: the UE 10 exhausts the data it has to send, the HS-RACH allocation expires, the Node B 12 terminates the HS-RACH allocation of the UE 10, or the UE 10 moves CELL_DCH state using a dedicated E-DCH connection. In general, if the data amount in the UE 10 exceeds a traffic volume threshold, the switch may be made to a CELL-DCH and a DCH/E-DCH is set up for the UE 10.

It may be desirable for the HS-RACH concept to reuse existing (Release 6) physical channels to simplify the implementation.

In accordance with some exemplary embodiments, the Node B 12 broadcasts on a BCH channel a Serving Grant (SG) parameter (or a parameter from which the UE 10 may derive the data rate to be used at maximum). The SG parameter may be set based on one one or more considerations, such as the current cell loading and/or an amount of allocated Node B 12 resources for receiving the random access transmission(s), as non-limiting examples. The UE 10 receives the BCH channel and the SG parameter. When using the E-DCH type of channel in a random access type of transmission, the E-TFC selection function of the UE 10 uses the SG parameter to define the maximum data rate that it may use in the HS-RACH UL transmission. Descriptions of the UE E-TFC selection can be found in Chapter 11.2 of TS 25.309 V6.6.0, at TS 25.321 V6.10.0 Section 11.8.1.4 and in Annex C of TS 25.321 V6.10.0 which gives pseudo code for selection. Reference in this regard may be made to TS 25.321 V6.10.0 (2006-September), "3rd Generation Partnership Project; Technical Specification Group Radio Access Network; Medium Access Control (MAC) protocol specification (Release 6)," Oct. 17, 2006.

Further in accordance with some exemplary embodiments, as a non-limiting example illustrating how to obtain a HS-RACH bit rate from a parameter sent on a BCH, the UE may be delivered a maximum power offset (that is, a relative power setting) the UE may use on the data transmission. The data rate translates to a power offset and that, together with the power offset defined by the HARQ profile, should not exceed the maximum power offset. That is, the UE must select a sufficiently low data rate such that the power offset defined by the data rate is sufficiently high so that the sum of the data rate's power offset plus the HARQ profile's power offset does not exceed the maximum power offset.

Figure 3:
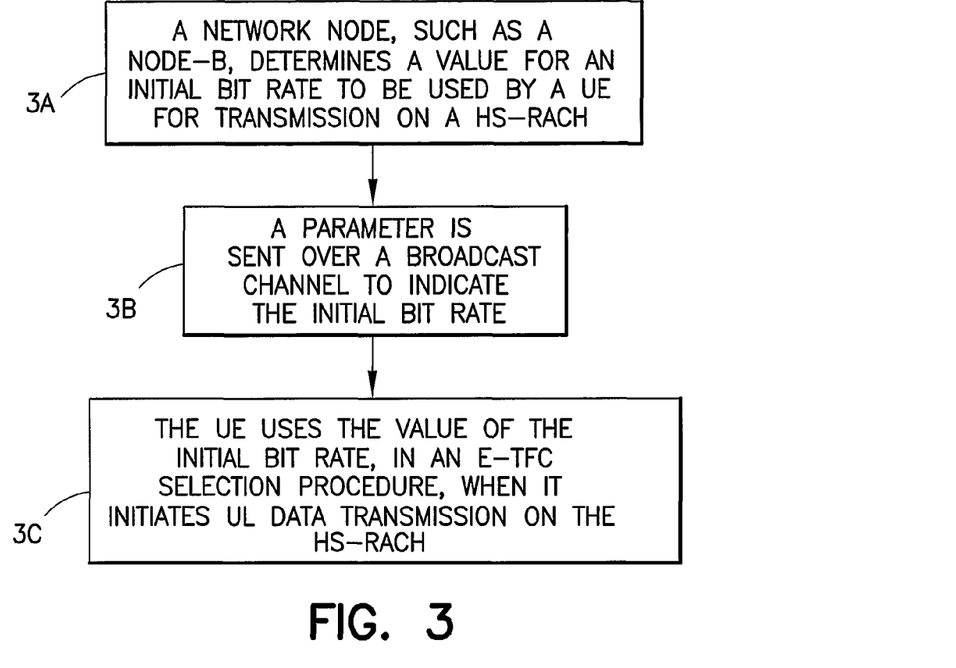
FIG. 3 is a logic flow diagram that is descriptive of one example for a method and computer program product that may be executed by the system shown in FIG. 1.

Referring to FIG. 3, and in accordance with a non-limiting, exemplary embodiment of a method and/or computer program product, at Block 3A a network node, such as the Node B 12, determines a value for an initial bit rate to be used by UEs (e.g., the UE 10) for transmission on a HS-RACH; at Block 3B a parameter is sent over a BCH to indicate the initial bit rate; and at Block 3C the UE 10 uses the value in the E-TFC selection procedure when it initiates uplink data transmission on the HS-RACH. The operation at Block 3A may involve, for example, a consideration of cell loading and/or a consideration of an amount of resources devoted to providing the HS-RACH.

Figure 4:
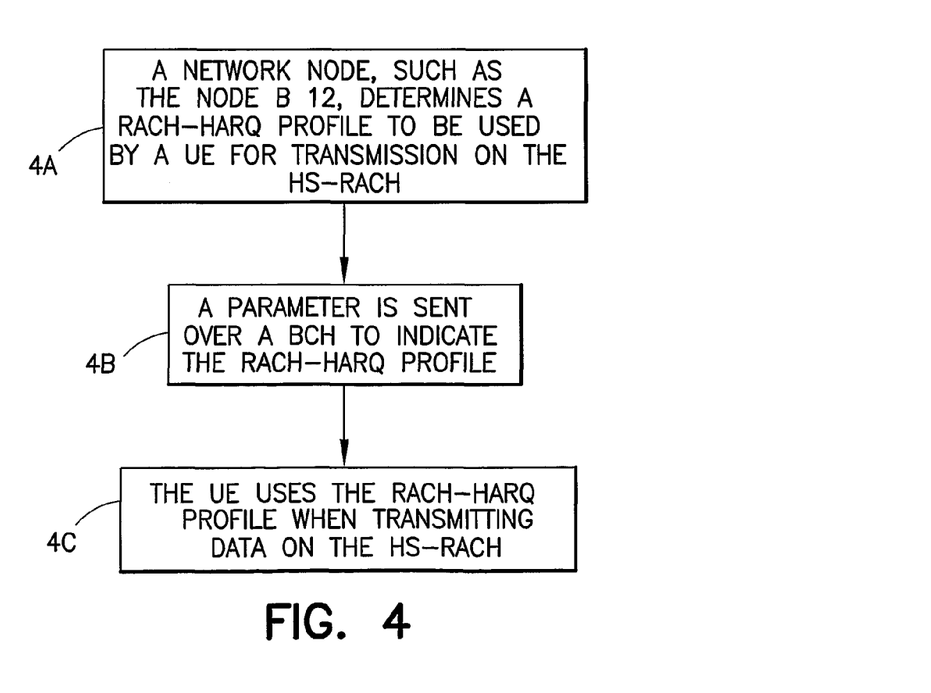
FIG. 4 is a logic flow diagram that is descriptive of a further exemplary method and computer program product that may be executed by the system shown in FIG. 1.

Referring to FIG. 4, and further in accordance with a non-limiting, exemplary embodiment of a method and/or computer program product, at Block 4A a network node, such as the Node B 12, determines a RACH-HARQ profile to be used by UEs (e.g., the UE 10) for transmission on the HS-RACH; at Block 4B a parameter is sent over a BCH to indicate the RACH-HARQ profile; and at Block 4C the UE 10 uses the RACH-HARQ profile when transmitting data on the HS-RACH, where the RACH-HARQ profile includes at least one of: a maximum number of retransmissions and a power offset attribute.

Note that the various blocks shown in FIGS. 3 and 4 may be viewed as method steps, and/or as operations that result from operation of computer program code, and/or as a plurality of coupled logic circuit elements constructed to carry out the associated function(s).

Thus, also disclosed is a UE that comprises circuitry to receive at least one parameter from a broadcast channel, and to use the received at least one parameter for determining at least one of an initial bit rate to use when transmitting data on the HS-RACH, or for determining a HARQ profile for use on the HS-RACH.

A Node B method, computer program product and apparatus is also disclosed that functions to determine a value for an initial bit rate to be used by UEs for transmission on the HS-RACH and/or a RACH-HARQ profile, and to send at least one parameter over a cell broadcast channel to indicate the initial bit rate and/or RACH-HARQ profile, where the RACH-HARQ profile includes at least one of: a maximum number of retransmissions and a power offset attribute.

In some exemplary embodiments of the invention, the particular RACH procedure utilized by the UE for communication over the RACH channel may be signaled in the broadcast. For example, the UE could be informed as to whether a Release 7 procedure or a Release 8 (LTE) procedure should be used. In other exemplary embodiments, no additional signaling is utilized and the UE utilizes the presence of the other parameters as an indication that the UE should use a specific RACH procedure (e.g., the LTE RACH procedures and signaling).

It is briefly noted that some exemplary embodiments of the invention may be viewed as providing at least one uplink parameter (i.e., indicating the initial bit rate and/or RACH-HARQ profile) to a UE via a broadcast. In some exemplary embodiments, the broadcast at least one uplink parameter comprises all the information necessary for the UE to begin transmitting (i.e., on the uplink) via the RACH. That is, in some exemplary embodiments, no other signaling is needed for the UE to begin using the uplink RACH. In some exemplary embodiments, the at least one parameter signaled in the broadcast comprises a SIB or an element of a SIB.

While described above with reference to a broadcast transmission, similar other types of transmissions could be utilized instead, such as a multicast transmission.

While described above with reference to a HARQ profile, further exemplary embodiments of the invention may utilize an ARQ profile. As utilized herein, HARQ is considered to be a subset of ARQ.

The exemplary embodiments of the invention, as discussed above and as particularly described with respect to exemplary methods, may be implemented as a computer program and/or as a computer program product comprising program instructions embodied on a tangible computer-readable medium, execution of the program instructions resulting in operations comprising steps of utilizing the exemplary embodiments or steps of the method.

As can be appreciated, one non-limiting advantage that is obtained by the use of the exemplary embodiments of this invention is that it avoids the use of (complex and slow) RRC-based signaling for setting/changing the bit rate in the HS-RACH, since the initial bit rate can be set/changed by the use of a simple broadcast message. Further, the bit rate on the HS-RACH can be optimized according to, for example, the load of the system.

Below are described various non-limiting exemplary embodiments of the invention. For convenience, the below-described exemplary embodiments are separately numbered, though such numbering should not be construed as wholly separating the described exemplary embodiments. Where suitable, and as otherwise apparent from the descriptions and discussions presented herein, one or more aspects of the various exemplary embodiments may be utilized together in any feasible, workable combination.

Figure 5:
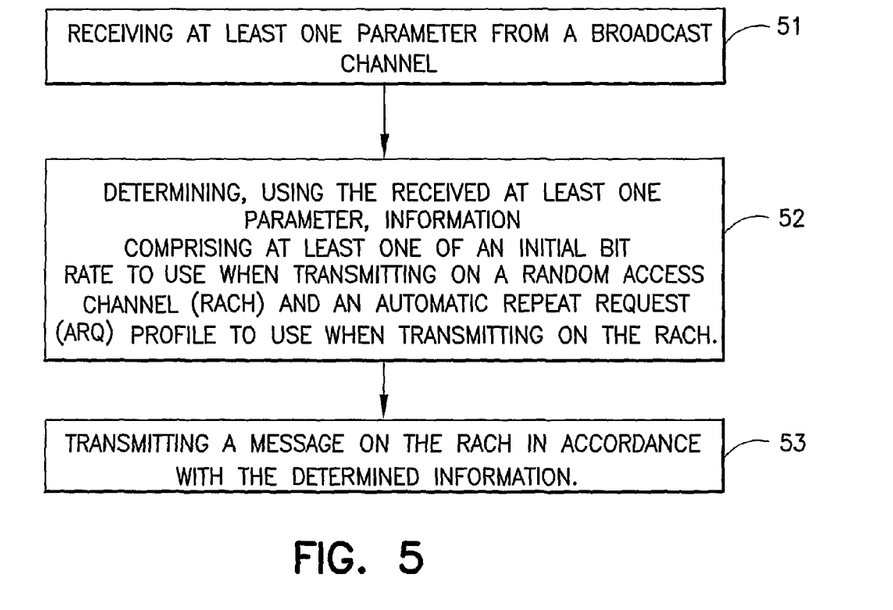
FIG. 5 is a logic flow diagram that is descriptive of another exemplary method and computer program product in accordance with aspects of the exemplary embodiments of the invention.

(1) In one non-limiting, exemplary embodiment, and as illustrated in FIG. 5, a method comprises: receiving at least one parameter from a broadcast channel (box 51); determining, using the received at least one parameter, information comprising at least one of an initial bit rate to use when transmitting on a random access channel (RACH) and an automatic repeat request (ARQ) profile to use when transmitting on the RACH (box 52); and transmitting a message on the RACH in accordance with the determined information (box 53).

A method as above, wherein the ARQ profile comprises a hybrid automatic repeat request (HARQ) profile. A method as in the previous, wherein the HARQ profile comprises second information indicative of at least one of a power offset attribute and a maximum number of retransmissions. A method as in any above, wherein the at least one parameter comprises at least one of: a serving grant parameter, a serving grant parameter for an enhanced dedicated channel (E-DCH) transport format combination (E-TFC) selection block to be used for E-TFC selection for transmitting a random access message on the RACH, and a maximum power offset for transmissions over the RACH. A method as in any above, wherein the at least one parameter is dependent on at least one consideration. A method as in the previous, wherein the at least one consideration comprises at least one of a load in a corresponding cell and an amount of allocated resources for receiving random access transmissions.

A method as in any above, wherein the initial bit rate is determined by using the at least one parameter to define a maximum bit rate for transmissions over the RACH. A method as in any above, further comprising: transmitting a measurement report if a traffic volume threshold is exceeded. A method as in any above, wherein the method is performed by a user equipment within a wideband code division multiple access communication system. A method as in any above, wherein the method is implemented by a computer program.

(2) In another non-limiting, exemplary embodiment, an apparatus comprises: a receiver configurable to receive at least one parameter from a broadcast channel; a processor configurable to determine, using the received at least one parameter, information comprising at least one of an initial bit rate to use when transmitting on a random access channel (RACH) and an automatic repeat request (ARQ) profile to use when transmitting on the RACH; and a transmitter configurable to transmit a message on the RACH in accordance with the determined information.

An apparatus as above, wherein the ARQ profile comprises a hybrid automatic repeat request (HARQ) profile. An apparatus as in the previous, wherein the HARQ profile comprises second information indicative of at least one of a power offset attribute and a maximum number of retransmissions. An apparatus as in any above, wherein the at least one parameter comprises at least one of: a serving grant parameter, a serving grant parameter for an enhanced dedicated channel (E-DCH)

transport format combination (E-TFC) selection block to be used for E-TFC selection for transmitting a random access message on the RACH, and a maximum power offset for transmissions over the RACH. An apparatus as in any above, wherein the at least one parameter is dependent on at least one of a load in a corresponding cell and an amount of allocated resources for receiving random access transmissions.

An apparatus as in any above, wherein the apparatus comprises a node in a wideband code division multiple access communication system. An apparatus as in any above, wherein the apparatus comprises a mobile phone. An apparatus as in any above, wherein the processor determines the initial bit rate by using the at least one parameter to define a maximum bit rate for transmissions over the RACH. An apparatus as in any above, wherein the at least one parameter is dependent on at least one consideration. An apparatus as in any above, wherein the transmitter is further configurable to transmit a measurement report in response to the processor determining that a traffic volume threshold is exceeded.

(3) In another non-limiting, exemplary embodiment, an apparatus comprises: means for receiving at least one parameter from a broadcast channel; means for determining, using the received at least one parameter, information comprising at least one of an initial bit rate to use when transmitting on a random access channel (RACH) and an automatic repeat request (ARQ) profile to use when transmitting on the RACH; and means for transmitting a message on the RACH in accordance with the determined information.

An apparatus as above, wherein the ARQ profile comprises a hybrid automatic repeat request (HARQ) profile. An apparatus as in the previous, wherein the HARQ profile comprises second information indicative of at least one of a power offset attribute and a maximum number of retransmissions. An apparatus as in any above, wherein the at least one parameter comprises at least one of: a serving grant parameter, a serving grant parameter for an enhanced dedicated channel (E-DCH) transport format combination (E-TFC) selection block to be used for E-TFC selection for transmitting a random access message on the RACH, and a maximum power offset for transmissions over the RACH. An apparatus as in any above, wherein the at least one parameter is dependent on at least one of a load in a corresponding cell and an amount of allocated resources for receiving random access transmissions.

An apparatus as in any above, wherein the apparatus comprises a node in a wideband code division multiple access communication system. An apparatus as in any above, wherein the apparatus comprises a mobile phone. An apparatus as in any above, wherein the means for receiving comprises a receiver, the means for determining comprises a processor and the means for transmitting comprises a transmitter. An apparatus as in any above, wherein the means for determining determines the initial bit rate by using the at least one parameter to define a maximum bit rate for transmissions over the RACH. An apparatus as in any above, wherein the at least one parameter is dependent on at least one consideration. An apparatus as in any above, wherein the means for transmitting is further for transmitting a measurement report in response to the means for determining further determining that a traffic volume threshold is exceeded.

(4) In another non-limiting, exemplary embodiment, a computer program product comprises program instructions embodied on a tangible computer-readable medium, execution of the program instructions resulting in operations comprising: receiving at least one parameter from a broadcast channel; determining, using the received at least one parameter, information comprising at least one of an initial bit rate to use when transmitting on a random access channel (RACH) and an automatic repeat request (ARQ) profile to use when transmitting on the RACH; and transmitting a message on the RACH in accordance with the determined information.

A computer program product as above, wherein the ARQ profile comprises a hybrid automatic repeat request (HARQ) profile. A computer program product as in the previous, wherein the HARQ profile comprises second information indicative of at least one of a power offset attribute and a maximum number of retransmissions. A computer program product as in any above, wherein the at least one parameter comprises at least one of: a serving grant parameter, a serving grant parameter for an enhanced dedicated channel (E-DCH) transport format combination (E-TFC) selection block to be used for E-TFC selection for transmitting a random access message on the RACH, and a maximum power offset for transmissions over the RACH. A computer program product as in any above, wherein the at least one parameter is dependent on at least one consideration. A computer program product as in the previous, wherein the at least one consideration comprises at least one of a load in a corresponding cell and an amount of allocated resources for receiving random access transmissions.

A computer program product as in any above, wherein the initial bit rate is determined by using the at least one parameter to define a maximum bit rate for transmissions over the RACH. A computer program product as in any above, execution of the program instructions resulting in operations further comprising: transmitting a measurement report if a traffic volume threshold is exceeded. A computer program product as in any above, wherein the program is performed by a user equipment or a processor of a user equipment within a wideband code division multiple access communication system.

Figure 6:
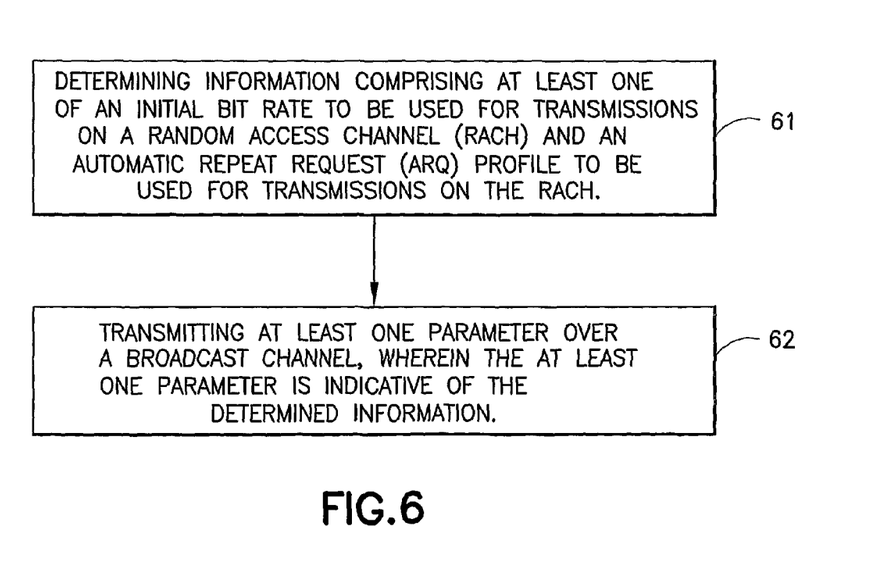
FIG. 6 is a logic flow diagram that is descriptive of a further exemplary method and computer program product in accordance with aspects of the exemplary embodiments of the invention.

(5) In another non-limiting, exemplary embodiment, and as illustrated in FIG. 6, a method comprises: determining information comprising at least one of an initial bit rate to be used for transmissions on a random access channel (RACH) and an automatic repeat request (ARQ) profile to be used for transmissions on the RACH (box 61); and transmitting at least one parameter over a broadcast channel, wherein the at least one parameter is indicative of the determined information (box 62).

A method as above, wherein the ARQ profile comprises a hybrid automatic repeat request (HARQ) profile. A method as in the previous, wherein the HARQ profile comprises second information indicative of at least one of a power offset attribute and a maximum number of retransmissions. A method as in any above, wherein the at least one parameter comprises at least one of: a serving grant parameter, a serving grant parameter for an enhanced dedicated channel (E-DCH) transport format combination (E-TFC) selection block to be used for E-TFC selection for transmitting a random access message on the RACH, and a maximum power offset for transmissions over the RACH.

A method as in any above, wherein the at least one parameter is dependent on at least one consideration. A method as in the previous, wherein the at least one consideration comprises at least one of a load in a corresponding cell and an amount of allocated resources for receiving random access transmissions. A method as in any above, wherein the initial bit rate is determined by using the at least one parameter to define a maximum bit rate for transmissions over the RACH. A method as in any above, wherein the method is performed by a user equipment within a wideband code division multiple access communication system. A method as in any above, wherein the method is implemented by a computer program.

(6) In another non-limiting, exemplary embodiment, an apparatus comprises: a processor configurable to determine information comprising at least one of an initial bit rate to be used for transmissions on a random access channel (RACH) and an automatic repeat request (ARQ) profile to be used for transmissions on the RACH; and a transmitter configurable to transmit at least one parameter over a broadcast channel, wherein the at least one parameter is indicative of the determined information.

An apparatus as above, wherein the ARQ profile comprises a hybrid automatic repeat request (HARQ) profile. An apparatus as in the previous, wherein the HARQ profile comprises second information indicative of at least one of a power offset attribute and a maximum number of retransmissions. An apparatus as in any above, wherein the at least one parameter comprises at least one of: a serving grant parameter, a serving grant parameter for an enhanced dedicated channel (E-DCH) transport format combination (E-TFC) selection block to be used for E-TFC selection for transmitting a random access message on the RACH, and a maximum power offset for transmissions over the RACH. An apparatus as in any above, wherein the at least one parameter is dependent on at least one of a load in a corresponding cell and an amount of allocated resources for receiving random access transmissions.

An apparatus as in any above, further comprising: a receiver configurable to receive at least one message from the RACH, wherein the message is transmitted in accordance with the determined information. An apparatus as in any above, wherein the apparatus comprises a node in a wideband code division multiple access communication system. An apparatus as in any above, wherein the apparatus comprises a mobile phone. An apparatus as in any above, wherein the processor determines the initial bit rate by using the at least one parameter to define a maximum bit rate for transmissions over the RACH. An apparatus as in any above, wherein the at least one parameter is dependent on at least one consideration.

(7) In another non-limiting, exemplary embodiment, an apparatus comprises: means for determining information comprising at least one of an initial bit rate to be used for transmissions on a random access channel (RACH) and an automatic repeat request (ARQ) profile to be used for transmissions on the RACH; and means for transmitting at least one parameter over a broadcast channel, wherein the at least one parameter is indicative of the determined information.

An apparatus as above, wherein the ARQ profile comprises a hybrid automatic repeat request (HARQ) profile. An apparatus as in the previous, wherein the HARQ profile comprises second information indicative of at least one of a power offset attribute and a maximum number of retransmissions. An apparatus as in any above, wherein the at least one parameter comprises at least one of: a serving grant parameter, a serving grant parameter for an enhanced dedicated channel (E-DCH) transport format combination (E-TFC) selection block to be used for E-TFC selection for transmitting a random access message on the RACH, and a maximum power offset for transmissions over the RACH. An apparatus as in any above, wherein the at least one parameter is dependent on at least one of a load in a corresponding cell and an amount of allocated resources for receiving random access transmissions.

An apparatus as in any above, wherein the apparatus comprises a node in a wideband code division multiple access communication system. An apparatus as in any above, further comprising: means for receiving at least one message from the RACH, wherein the message is transmitted in accordance with the determined information. An apparatus as in any above, wherein the apparatus comprises a mobile phone. An apparatus as in any above, wherein the means for receiving comprises a receiver, the means for determining comprises a processor and the means for transmitting comprises a transmitter. An apparatus as in any above, wherein the means for determining determines the initial bit rate by using the at least one parameter to define a maximum bit rate for transmissions over the RACH. An apparatus as in any above, wherein the at least one parameter is dependent on at least one consideration.

(8) In another non-limiting, exemplary embodiment, a computer program product comprises program instructions embodied on a tangible computer-readable medium, execution of the program instructions resulting in operations comprising: determining information comprising at least one of an initial bit rate to be used for transmissions on a random access channel (RACH) and an automatic repeat request (ARQ) profile to be used for transmissions on the RACH; and transmitting at least one parameter over a broadcast channel, wherein the at least one parameter is indicative of the determined information.

A computer program product as above, wherein the ARQ profile comprises a hybrid automatic repeat request (HARQ) profile. A computer program product as in the previous, wherein the HARQ profile comprises second information indicative of at least one of a power offset attribute and a maximum number of retransmissions. A computer program product as in any above, wherein the at least one parameter comprises at least one of: a serving grant parameter, a serving grant parameter for an enhanced dedicated channel (E-DCH) transport format combination (E-TFC) selection block to be used for E-TFC selection for transmitting a random access message on the RACH, and a maximum power offset for transmissions over the RACH.

A computer program product as in any above, wherein the at least one parameter is dependent on at least one consideration. A computer program product as in the previous, wherein the at least one consideration comprises at least one of a load in a corresponding cell and an amount of allocated resources for receiving random access transmissions. A computer program product as in any above, wherein the initial bit rate is determined by using the at least one parameter to define a maximum bit rate for transmissions over the RACH. A computer program product as in any above, wherein the program is implemented by a user equipment or a processor of a user equipment within a wideband code division multiple access communication system.

(9) In another non-limiting, exemplary embodiment, a system comprises: a first apparatus configurable to determine information comprising at least one of an initial bit rate to be used for transmissions on a random access channel (RACH) and an automatic repeat request (ARQ) profile to be used for transmissions on the RACH, and further configurable to transmit at least one parameter over a broadcast channel, wherein the at least one parameter is indicative of the determined information; and a second apparatus configurable to receive the at least one parameter from the broadcast channel, to determine, using the received at least one parameter, the information, and further to transmit a message on the RACH in accordance with the determined information.

A system as above, and further comprising one or more further aspects of the exemplary embodiments of the invention as described herein and/or one or more dependent claims as recited below and further described herein with respect to aspects of exemplary apparatus.

(10) In another non-limiting, exemplary embodiment, a wireless communication system comprises: a first apparatus comprising a first processor and a first transmitter, wherein the first processor is configurable to determine information comprising at least one of an initial bit rate to be used for transmissions on a random access channel (RACH) and an automatic repeat request (ARQ) profile to be used for transmissions on the RACH, wherein the first transmitter is configurable to transmit at least one parameter over a broadcast channel, wherein the at least one parameter is indicative of the determined information; and a second apparatus comprising a receiver, a second processor and a second transmitter, wherein the receiver is configurable to receive the at least one parameter from the broadcast channel, wherein the second processor is configurable to determine, using the received at least one parameter, the information, wherein the second transmitter is configurable to transmit a message on the RACH in accordance with the determined information.

A system as above, and further comprising one or more further aspects of the exemplary embodiments of the invention as described herein and/or one or more dependent claims as recited below and further described herein with respect to aspects of exemplary apparatus.

(11) In another non-limiting, exemplary embodiment, a method comprises: determining a value for an initial bit rate to be used by at least one user equipment for transmission on a RACH; transmitting at least one parameter over a broadcast channel, wherein the at least one parameter is indicative of the determined value; receiving the transmitted at least one parameter; and using the value indicated by the received at least one parameter in an E-TFC selection procedure during initiation of uplink data transmission on the RACH.

A method as above, and further comprising one or more further aspects of the exemplary embodiments of the invention as described herein and/or one or more dependent claims as recited below and further described herein with respect to aspects of exemplary methods.

(12) In another non-limiting, exemplary embodiment, a method comprises: determining a RACH-ARQ profile to be used by at least one user equipment for transmission on a RACH; transmitting at least one parameter over a broadcast channel, wherein the at least one parameter is indicative of the determined RACH-ARQ profile; receiving the transmitted at least one parameter; and transmitting on the RACH in accordance with the RACH-ARQ profile indicated by the received at least one parameter.

A method as above, and further comprising one or more further aspects of the exemplary embodiments of the invention as described herein and/or one or more dependent claims as recited below and further described herein with respect to aspects of exemplary methods.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving at least one parameter from a broadcast channel;
   determining, based at least in part on the received at least one parameter, information comprising at least one of an initial bit rate to use when transmitting a random access message on a shared enhanced dedicated channel resource and a hybrid automatic repeat request profile to use when transmitting the random access message on the shared enhanced dedicated channel resource; and
   transmitting the random access message on the shared enhanced dedicated channel resource in accordance with the determined information,
   wherein the at least one parameter comprises a serving grant parameter for an enhanced dedicated channel transport format combination selection block used for enhanced dedicated channel transport format combination selection for the transmitting of the random access message on the shared enhanced dedicated channel resource.

2. The method according to claim 1, wherein the at least one parameter further comprises a maximum power offset for transmissions over the shared enhanced dedicated channel resource.

3. A non-transitory computer readable memory storing at least one computer program product, the at least one computer program product executed by at least one processor to perform operations of:

receiving at least one parameter from a broadcast channel;
determining, based at least in part on the received at least one parameter, information comprising at least one of an initial bit rate to use when transmitting a random access message on a shared enhanced dedicated channel resource and a hybrid automatic repeat request profile to use when transmitting the random access message on the shared enhanced dedicated channel resource; and
transmitting the random access message on the shared enhanced dedicated channel resource in accordance with the determined information,
wherein the at least one parameter comprises a serving grant parameter for an enhanced dedicated channel transport format combination selection block used for enhanced dedicated channel transport format combination selection for the transmitting of the random access message on the shared enhanced dedicated channel resource.

4. An apparatus comprising:
at least one processor; and
at least one memory including computer program code, where the at least one memory and the computer program code are configured, with the at least one processor, to cause the apparatus to at least:
receive at least one parameter from a broadcast channel;
determine, based at least in part on the received at least one parameter, information comprising at least one of an initial bit rate to use when transmitting a random access message on a shared enhanced dedicated channel resource and a hybrid automatic repeat request profile to use when transmitting the random access message on the shared enhanced dedicated channel resource; and
transmit the random access message on the shared enhanced dedicated channel resource in accordance with the determined information,
wherein the at least one parameter comprises a serving grant parameter for an enhanced dedicated channel transport format combination selection block used for enhanced dedicated channel transport format combination selection for the transmitting of the random access message on the shared enhanced dedicated channel resource.

5. The apparatus according to claim 4, wherein the hybrid automatic repeat request profile comprises second information indicative of at least one of a power offset attribute and a maximum number of retransmissions.

6. The apparatus according to claim 4, wherein the at least one parameter comprises a maximum power offset for transmissions over the shared enhanced dedicated channel resource.

7. The apparatus according to claim 4, wherein the at least one parameter is dependent on at least one of a load in a corresponding cell and an amount of allocated resources for receiving random access transmissions.

8. The apparatus according to claim 4, wherein an initial transmit power of said message is at least based on a last previously used preamble power.

9. The apparatus according to claim 8, wherein said initial transmit power of said message is the last previously used preamble power plus an offset.

10. The apparatus according to claim 4, wherein the apparatus comprises a user equipment in a wideband code division multiple access communication system.

11. A method comprising:
determining information comprising at least one of an initial bit rate to be used for transmission of a random access message on a shared enhanced dedicated channel resource and a hybrid automatic repeat request profile to be used for transmission of the random access message on the shared enhanced dedicated channel resource; and
transmitting at least one parameter over a broadcast channel, wherein the at least one parameter is indicative of the determined information,
wherein the at least one parameter comprises a serving grant parameter for an enhanced dedicated channel transport format combination selection block to be used for an enhanced dedicated channel transport format combination selection for transmitting the random access message on the shared enhanced dedicated channel resource.

12. The method according to claim 11, wherein the at least one parameter comprises a maximum power offset for transmissions over the shared enhanced dedicated channel resource.

13. A non-transitory computer readable memory storing at least one computer program product, the at least one computer program product executed by at least one processor to perform operations of:
determining information comprising at least one of an initial bit rate to be used for transmission of a random access message on a shared enhanced dedicated channel resource and a hybrid automatic repeat request profile to be used for transmission of the random access message on the shared enhanced dedicated channel resource; and
transmitting at least one parameter over a broadcast channel, wherein the at least one parameter is indicative of the determined information,
wherein the at least one parameter comprises a serving grant parameter for an enhanced dedicated channel transport format combination selection block to be used for an enhanced dedicated channel transport format combination selection for transmitting the random access message on the shared enhanced dedicated channel resource.

14. An apparatus comprising:
at least one processor; and
at least one memory including computer program code, where the at least one memory and the computer program code are configured, with the at least one processor, to cause the apparatus to at least:
determine information comprising at least one of an initial bit rate to be used for transmission of a random access message on a shared enhanced dedicated channel resource and a hybrid automatic repeat request profile to be used for transmission of the random access message on the shared enhanced dedicated channel resource; and
transmit at least one parameter over a broadcast channel, wherein the at least one parameter is indicative of the determined information,
wherein the at least one parameter comprises a serving grant parameter for an enhanced dedicated channel transport format combination selection block to be used for an enhanced dedicated channel transport format combination selection for transmitting the random access message on the shared enhanced dedicated channel resource.

15. The apparatus according to claim 14, wherein the hybrid automatic repeat request profile comprises second information indicative of at least one of a power offset attribute and a maximum number of retransmissions.

16. The apparatus according to claim 14, wherein the at least one parameter comprises a maximum power offset for transmissions over the shared enhanced dedicated channel resource.

17. The apparatus according to claim 14, wherein the at least one parameter is dependent on at least one of a load in a corresponding cell and an amount of allocated resources for receiving random access transmissions.

18. The apparatus according to claim 14, wherein the apparatus comprises a node in a wideband code division multiple access communication system.

19. The apparatus according to claim 14, wherein the at least one memory including the computer program code is configured with the at least one processor to cause the apparatus to receive at least one message from the shared enhanced dedicated channel resource, wherein the message is transmitted in accordance with the determined information.

20. The apparatus according to claim 14, wherein the apparatus is part of a network element.

* * * * *